(12) United States Patent
Wagner (10) Patent No.: US 7,754,134 B2
(45) Date of Patent: Jul. 13, 2010

(54) INJECTION MOLDING PROCESS

(76) Inventor: Michael S. Wagner, 426 Regatta Dr., Avon Lake, OH (US) 44012

( * ) Notice: Subject to any disclaimer, the term of this patent is extended or adjusted under 35 U.S.C. 154(b) by 174 days.

(21) Appl. No.: 11/937,016

(22) Filed: Nov. 8, 2007

(65) Prior Publication Data

US 2009/0121394 A1 May 14, 2009

(51) Int. Cl.
*B29C 45/57* (2006.01)
(52) U.S. Cl. ............... 264/328.1; 264/328.13; 264/328.8; 264/500; 425/436 R; 425/555; 425/556; 425/563
(58) Field of Classification Search ........... 264/328.8, 264/500, 328.13; 425/436 R, 555, 556, 563
See application file for complete search history.

(56) References Cited

U.S. PATENT DOCUMENTS

| | | | |
|---|---|---|---|
| 3,746,492 | A | 7/1973 | DeVita |
| RE28,721 | E | 2/1976 | Farrell |
| 3,960,996 | A | 6/1976 | Balevski et al. |
| 4,070,142 | A | 1/1978 | Farrell |
| 4,101,617 | A | 7/1978 | Friederich |
| 4,290,701 | A | 9/1981 | Schad |
| 4,722,679 | A | 2/1988 | Farrell |
| 4,749,536 | A | 6/1988 | Farrell |
| 4,781,554 | A | 11/1988 | Hendry |
| 4,834,294 | A | 5/1989 | Herzog |
| 4,855,094 | A * | 8/1989 | Hendry ........................ 264/40.3 |
| 4,994,220 | A * | 2/1991 | Gutjahr et al. ................ 264/69 |
| 5,011,399 | A | 4/1991 | Farrell |
| 5,106,283 | A | 4/1992 | Sauer et al. |
| 5,112,563 | A | 5/1992 | Baxi |
| 5,135,701 | A | 8/1992 | Farrell |
| 5,222,514 | A | 6/1993 | Klotz |
| 5,248,460 | A | 9/1993 | Tsutsumi |
| 6,531,087 | B1 | 3/2003 | Hendry |
| 2005/0161847 | A1 * | 7/2005 | Weatherall et al. ......... 264/40.1 |

* cited by examiner

*Primary Examiner*—Joseph S Del Sole
*Assistant Examiner*—Stephen Sollenberger
(74) *Attorney, Agent, or Firm*—Buckingham, Doolittle & Burroughs, LLP (57) ABSTRACT

The present invention relates to an injection molding process that improves recovery limited productivity. The present invention advantageously applies pressurized fluid within the nozzle of an injection molding machine to improve the machine's productivity. In accordance with one aspect of the invention, an existing or new injection molding machine is outfitted with a pressurized fluid system at the nozzle between the plasticizer barrel and the melt manifold. The use of a specialized nozzle and isolation valve allows the pressurized fluid to displace material within the nozzle and runner, ensuring the proper pressure is applied to the plastic resin within the mold during pack and hold while the plasticizing screw can begin its recovery cycle. Finally, the pressurized fluid can be evacuated from the nozzle melt stream area either via the fluid entrance or a fluid pin.

13 Claims, 8 Drawing Sheets

INJECTION MOLDING PROCESS

TECHNICAL FIELD

The invention relates generally to an injection molding process. More specifically, the invention relates to an injection molding process that improves recovery limited productivity.

BACKGROUND OF THE INVENTION

Injection molding is the method of forming thermoplastic or thermoset plastic, metal, or ceramic material by injection into a closed mold. Conventionally during injection molding, an injection unit injects heated material into a closed mold device. A clamp device closes the opening in the mold in which the injection unit injects the heated material. The heated material in the mold then cools and forms, taking its intended shape. Once adequately hardened, the mold opens, the injection molded part is ejected from the mold, and the mold again closes, the clamp device opens and the next cycle begins.

During a conventional injection molding cycle the injection unit injects the material into the mold (the injection step) until the material is packed in to the mold (the pack step) and held within the mold (the hold step). The material in the mold cools (the cooling step) and plasticizes (also commonly known as plasticating) (the plasticizing step) until the material is hard enough so the mold can be opened, the material can be ejected from the mold, and the mold can close to await the next injection cycle (the open eject close step). The cooling step and the plasticizing step often occur in parallel to improve productivity.

In order to reduce the molding cycle time of injection molding machine, such machines have been provided with a valve, actuated mechanically, pneumatically or hydraulically, to cut-off communication between the mold and the plasticizing (ie. extruder) unit as soon as the plastic material has cooled enough to achieve gate freeze. The gate freeze event being defined as complete crystallization of the material at mold gate, and signifying the end of the hold step, thereby completely isolating the molded part from further influence by the plastic resin within the injection unit assembly. Once isolated, the plasticizer can begin its screw recovery and accumulate plastic material for the next shot simultaneous to the plastic material in the mold cooling sufficiently for part removal.

In the practice of injection molding, certain final part geometries are such that the cycle time may be limited by the plasticizer screw recovery time (known as a recovery limited cycle) segment rather than the typical limitation of part cooling. During recovery limited cycles a waiting period (known as the wait step) exists between the cooling and plasticizing of the first piece, while the injection molding machine prepares to inject the next volume of molten material into the mold to begin forming the next piece. When producing these types of injection molded parts, the overall machine cycle time could be improved by removing this limitation.

Various techniques have been taught to overcome this delay, notably Farrell's U.S. Pat. No. 4,070,142 and U.S. Pat. No. 4,749,536. While these modifications to a typical injection molding machine achieved both the requisite cycle time improvement and increased shot capacity, in practice these injection molding machine retrofits required extensive modifications to the injection unit machine bed and additional hydraulic pumping and valve configurations with additional control coordination.

Separate developments advanced the use of a pressurized fluid in conjunction with the plastic resin to achieve benefits of part dimensional stability, faster part cooling, stronger sections within the part via a hollow cylindrical shape, reduction of cycle time, and to reduce machine clamp tonnage. These advances were taught by Friederich originally in U.S. Pat. No. 4,101,617 as well as Hendry in U.S. Pat. No. 4,781, 554 and U.S. Pat. No. 4,855,094. In these cases, the pressurized fluid is applied within the mold either by introduction through the nozzle, the runner system or directly into the mold.

Accordingly, it has been considered desirable to develop a new and improved method for injection molding and an apparatus therefore and moldings produced thereby which would overcome the foregoing difficulties and others while providing improved results.

SUMMARY OF THE INVENTION

The present invention relates to an improved injection molding process which effectively shortens the injection molding cycle time for parts categorized by recovery limited molding cycle times.

More specifically, the patent invention is directed to the provisions of using fluid displacing injection molding methodology, to exert the proper pressures for the pack and hold steps of the injection molding cycle, ensuring adequate material is displaced to the mold allowing part quality attainment, while allowing the injection unit to begin plasticization recovery sooner to affect a reduction of overall cycle time. The provisions for applying this invention is applicable to a wide variety of resin materials and will not limit the injection molding machines ability to function in a conventional capacity.

In contrast to the well documented gas-assisted injection molding patent background, this invention methodology is directed to providing fluid assistance whereby the displacing fluid pressure is intended to remain in the machine nozzle and nozzle body, contrasting to the conventional methodology of directing the gas to the mold for use directly on or within the part.

According to one aspect of the invention methodology, means are provided to isolate the injection unit plasticization system from a point just downstream of the end cap of the injection unit barrel, allowing the introduction of pressurized fluid into the nozzle body providing the pressure necessary for the pack and hold steps of the cycle. The fluid pressure, as provided by this invention methodology, will be highly controllable, allowing a smooth transition from the machine's injection unit pressure as applied to the plastic flow front to the pressure brought to bear by the fluid as the invention's isolation valve closes. In addition, control functions of pressure, flow and timing are provided to allow flexible control profiles to be created which correspond to the optimal conditions for individual plastic resin varieties. These control functions are provided with a closed-loop feed back signal from monitoring devices allowing a precise response to changing conditions.

According to a further aspect of the invention methodology, material reserve provisions can be provided within the nozzle assembly configuration allowing a conveniently available material reserve, commensurate to the shrinkage characteristics of the specific plastic resin material being utilized, to be deployed to the injection mold and offset the material shrinkage due to crystallization that commonly occurs during the injection molding process.

According to a feature of a certain embodiment of the invention methodology, the cycle includes an injected fluid pressure coordinated with the closing of the isolation valve and reduction of the machine's injection pressure to provide a steady pressure for the plastic material.

It is an object of this invention to provide an improved injection molding process which effectively shortens the injection molding cycle time for parts categorized by recovery limited molding cycle times.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The preferred embodiment of the invention, illustrative of the best mode in which applicant has contemplated applying the principals is set forth in the following description and is shown in the drawings and is particularly and distinctly pointed out and set forth in the appended claims. The invention may take physical form in certain parts and arrangements of parts, numerous embodiments of which will be described in detail in the specification and illustrated in the accompanying drawings which form a part hereof, and wherein:

FIG. 8 (comprised of FIG. 8A and FIG. 8B) is a set of illustrations depicting the cycle time elements for a recovery limited injection molding part, wherein FIG. 8A is a conventional injection molding and FIG. 8B is an injection molding machine utilizing the present invention, the gate freeze event detection is illustrated as an icon.

DETAILED DESCRIPTION OF THE INVENTION

Referring now to the drawings wherein the showings are for purposes of illustrating numerous embodiments of the invention only and not for purposes of limiting the same, the figures illustrate the novel idea of an injection molding process that improves recovery limited productivity.

Described herein are a fluid injection apparatus and a fluid injection methodology. Within the present description the term fluid is understood to encompass both gas and liquids. Also herewithin, the terms material, plastic resin and resin and combinations thereof are used interchangeably to refer to the substance injected into the mold by the injection molding machine to form the molded piece.

Certain embodiments of the invention described herein are intended for use in association with a fluid assisted injection molding process of the type in which hot resin is injected into a mold cavity, mold packing is begun via the conventional injection unit operation, and fluid is injected into the resin melt within the nozzle assembly providing pressure during the pack and hold steps of the injection molding cycle via displacement of the reserve resin within the isolation valve and nozzle assembly toward the mold. The injection unit will begin the plasticization preparation of the next material resin shot simultaneously with the pack and hold steps of the cycle. As the gate freeze timer dictates or gate freeze event conditions are recognized the fluid pressure is vented from the nozzle assembly while the plastic part cools suitably to allow part handling, followed by the mold opening to remove the molded part.

The present invention relates to an injection molding process that improves recovery limited productivity. The present invention advantageously applies pressurized fluid within the nozzle of an injection molding machine to improve the machine's productivity. In accordance with one aspect of the invention, an existing or new injection molding machine is outfitted with a pressurized fluid delivery system at the nozzle between the plasticizer barrel and the melt manifold. The use of a specialized nozzle and isolation valve allows the pressurized fluid to displace material within the nozzle and runner, ensuring the proper pressure is applied to the plastic resin within the mold during pack and hold while the plasticizing screw can begin its recovery cycle. Finally, the pressurized fluid can be evacuated from the nozzle melt stream area either via the fluid entrance or a fluid pin, allowing a more complete evacuation and thereby, less fluid removal via the mold venting system.

Figure 1:
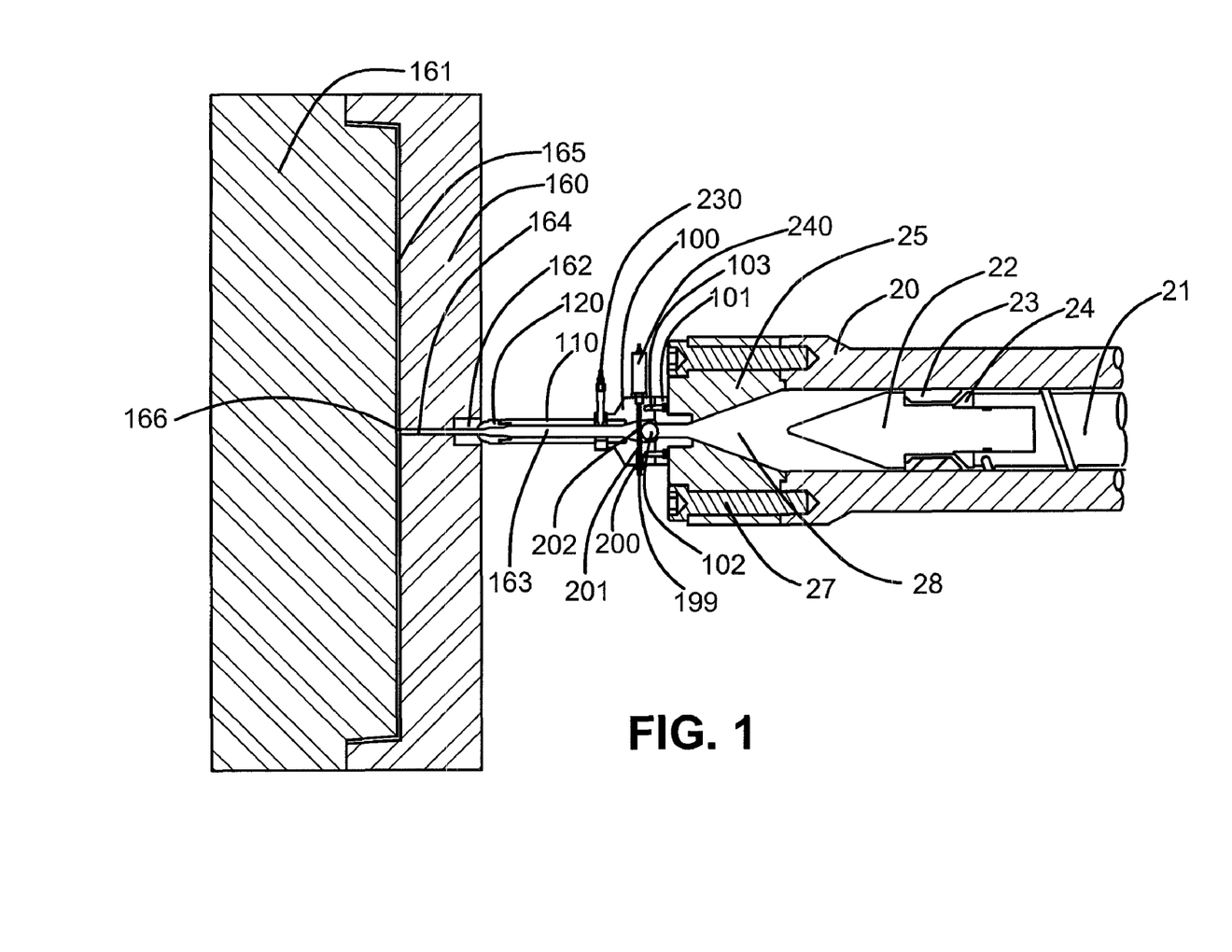
FIG. 1 is a cross-sectional side elevational view illustrating an injection molding apparatus made in accordance with an embodiment of this invention.

In the preferred method and approach illustrated in FIG. 1, the fluid is introduced into the nozzle assembly through a fluid plenum in the nozzle adapter/isolation valve assembly. Specifically, fluid entry 199 is through high pressure fluid nozzle fitting 200 flowing through fluid runner channel 201 and connected to fluid distribution plenum 202 within the nozzle adapter/isolation valve assembly comprised of halves 100 & 101 and secured by socket headed cap screws 103. Fluid control feedback is from fluid pressure transducer 240 terminating fluid runner channel 201. Isolation valve ball 102 is shown in the open position, the forward position is limited by fluid distribution plenum 202, allowing the plastic resin within the injection unit to communicate directly through to mold cavity 165, via plastic resin 163 contained within the nozzle assembly defined by nozzle body 110 and nozzle tip 120, as defined by first 160 and second mold 161 halves. Plastic pressure control feedback is from melt flow transducer 230 mounted in nozzle body 110. With isolation valve ball 102 open, the injection unit assembly operates as a conventional machine.

Figure 2:
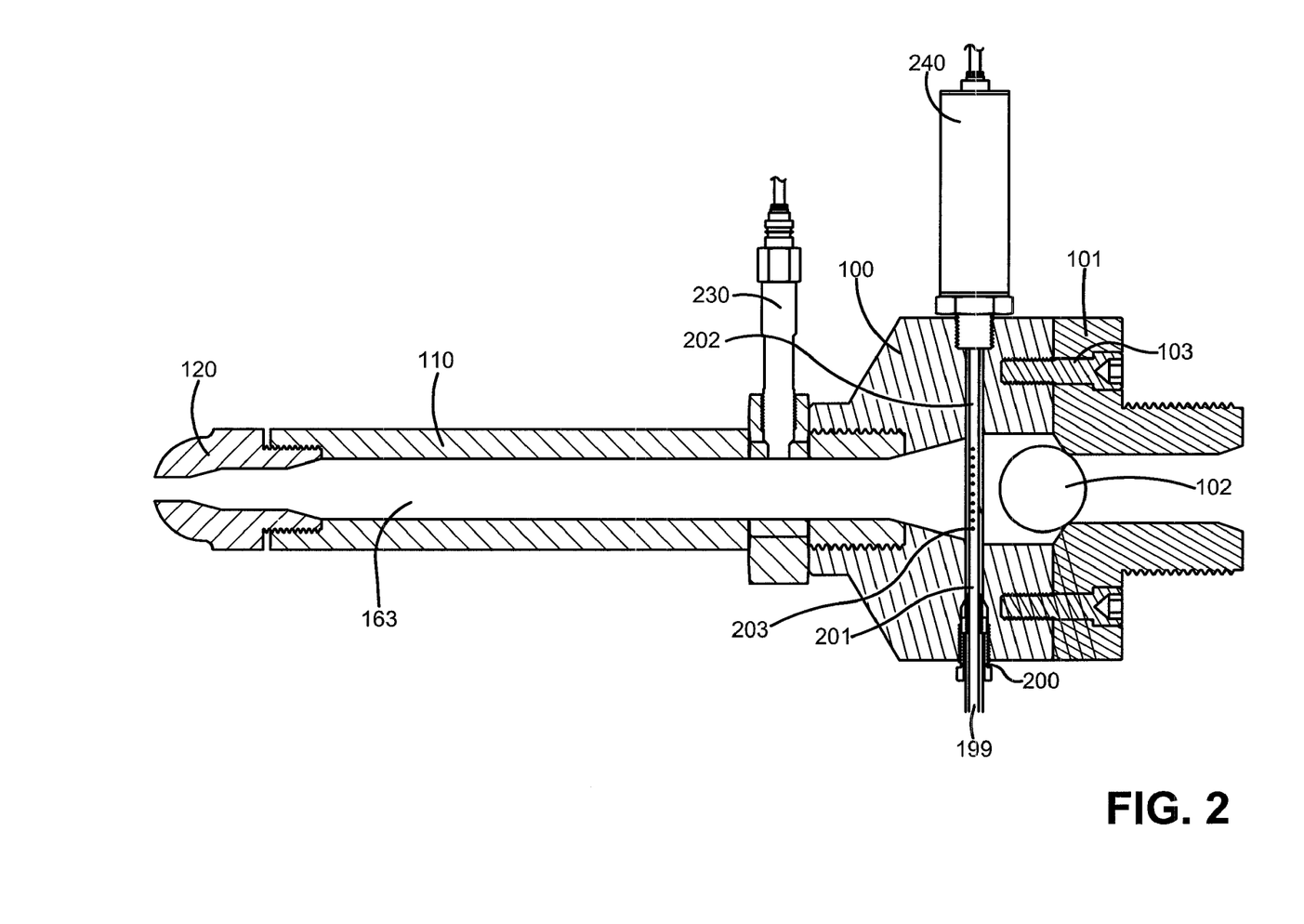
FIG. 2 is an enlarged cross-sectional side elevational view showing the specialized isolation valve of the embodiment of the invention shown in FIG. 1, further illustrating the nozzle assembly and entry/exit details for the external fluid for developing pressure during the pack and hold steps of the injection molding cycle.

Referring to FIG. 1 and FIG. 2, injection screw 21 with non-return valve (NRV) assembly, comprised of pieces 22, 23, and 24, rotated by a motor and reciprocated axially forward and backward by either a fluid-filled cylinder or servo-motor driving a linear actuation device, not shown, operating within a longitudinal bore extending through heated barrel 20 plasticizes the plastic resin material in chamber 28. The motor used to rotate the injection screw may be hydraulic, electric, or any other motor generally known in the art. Attached to barrel 20 via plurality of fasteners 27 is end cap 25 with a narrowing resin transfer passageway, tapered for NRV tip 22, an isolation valve assembly, with halves 100 and 101, nozzle body 110, and nozzle tip 120. During the screw recovery segment of the injection molding cycle, both the isolation valve assembly 100/101 is open and NRV check ring 23 is seated forward in contact with NRV tip 22 and screw 21 rotation develops shear heat which in conjunction with the heaters (not shown) affixed to barrel 21 melt the plastic resin pellets, not shown. At the conclusion of screw recovery, the next injection shot of material 28 accumulates in front of NRV check ring 23, whereby screw 21 with non-return valve behaves as a pressurizing ram via the reciprocating motion creating the motive force for injection.

The nozzle assembly contacts the injection mold assembly at nozzle sprue bushing 162 fastened to mold body half 160. Mold body halves 160 & 161 define mold cavity 165. The plastic communication pathway from nozzle sprue bushing 162 to mold cavity follows plastic runner system 164, being either a cold or hot runner system, and injection mold gate 166 located just prior to the mold cavity.

During the injection segment of the total cycle, screw 21 advances forward and NRV check ring 23 is seated against NRV rear seat 24 pushing plasticized resin 163 through the open isolation valve assembly 100/101, nozzle body 110, nozzle tip 120, sprue bushing 162, runner 164, mold gate 166, and into part cavity 165 as created by two mold halves 160 and 161.

At the completion of injection, the pack step of the injection molding cycle can be accomplished either conventionally, maintaining an open isolation valve assembly 100/101, and using injection screw 21 to continue to pack the plastic resin melt into mold cavity 160/161, or at an advantageous time, an external fluid pressure can be increased simultaneous to the reduction of injection unit pressure, maintaining a constant pressure on the plastic resin melt, by permitting check valve ball 102 to close, as shown in FIG. 2, isolating the injection unit from the plastic resin in mold 165.

For injection molding parts with recovery-limited cycle times, the embodiment of the invention illustrated in FIG. 1 and FIG. 2, can be used to improve productivity. In use, displacement pressure via an external fluid is introduced to the melt stream within the isolation valve. The displacement pressure is coordinated with the diminishment of pressure from the injection unit ram function. Control is coordinated via signals from the injection molding machine controller, closed-loop feedback from melt pressure transducers in nozzle 230 and mold (not shown), these signals are inputs to controller 50. The fluid pressure is controlled to maintain a stable pressure on plastic resin melt 163; whereby, the plastic flow front pressure, as maintained with the mold cavity should remain stable and within control.

The fluid used throughout the process described herein may be any fluid, liquid or gas that accomplishes the purpose as described herein. Examples of fluids that may be appropriate in certain embodiments of the invention include, but are not limited to nitrogen or other inert gases, water or any other liquid. It is foreseen that certain gases or liquids may be advantageous to use with the invention, and the contact of certain fluids with the resin of the injection molding process may react in a way to increase the speed of hardening of the material.

As the present invention differs from a conventional fluid assisted molding, the displacement pressure of the fluid is never intended to enter mold cavity 160/161 or to hollow part 165, the only purpose is to improve cycle time of recovery limited injection molded parts by allowing the plasticizing segment to occur simultaneous with the pack and hold steps of the injection molding cycle. This is illustrated graphically in FIG. 8. To maintain flexibility to accommodate both varying sequence timing fluid introduction points within the pack segment and to account for the various plastic shrinkage characteristics, adequate inventories of melted plastic material 163 must be available for the fluid to displace into mold cavity 160/161. This is accomplished according to the gas plenum design, plurality of holes 202, as well as placement with isolation valve 100/101 upstream of nozzle body 110.

Figure 7:
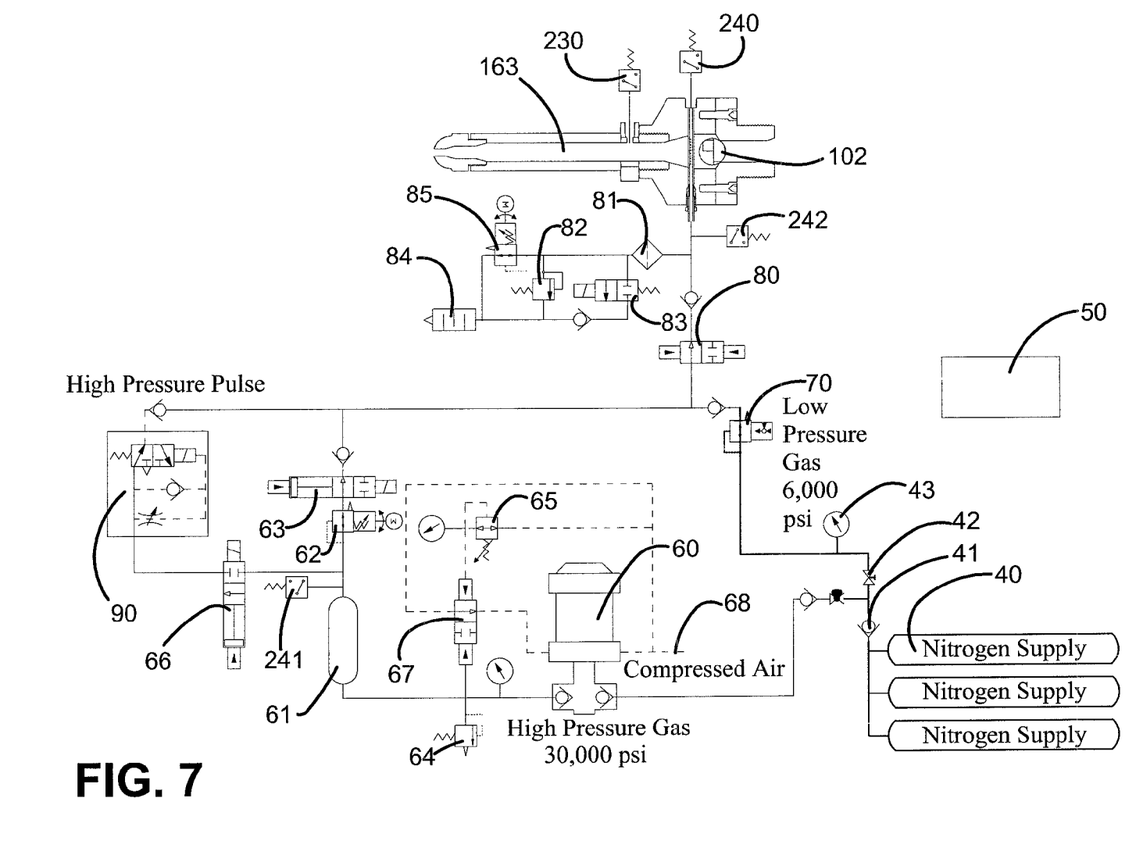
FIG. 7 is a schematic illustration of the pressure management and control system.

During plastic resin injection, as the Injection Unit Ram begins to exert pressure, some external fluid pressure is applied to distribution plenum 202 and controlled via fluid pressure transducer 240 to prevent the melted plastic resin flow front from intruding into fluid distribution runner 201 via the plurality of small holes 203 for fluid introduction. The plurality of fluid introduction holes 203 are sized collectively to limit fluid pressure drop and individually to advantageously reject plastic resin backflow due to capillary effects and kinematics viscosity differences, however, this is managed via the servo-controlled regulator 70 ensuring this intrusion is prevented. Servo-controlled regulator 70 controls the pressure supplied via fluid cylinders 40. Isolation and safety monitoring are provided via check valve 41, manual shutoff valve 42, and pressure gauge 43 as shown in FIG. 7.

At the conclusion of injection, when using the external fluid pressure, the increase in external fluid pressure is achieved via opening servo-regulator 70 allowing a pressure increase through open two-way valve 80 to be imparted on plastic melt 163. Control of the pressure ramp is via input signals from both plastic pressure transducer 230 and fluid pressure transducer 240 into controller 50. As the required pressure exceeds nominal fluid storage pressure, high pressure dome valve 63 opens and the pressure control switches to high pressure regulator 62 using the same overall control scheme as described above. Intensifier 60 operates to maintain an adequate volume and pressure within high pressure cylinder 61. It is controlled via compressed air source 68, regulated by adjustable pressure regulator 65, two-way valve 67, and safety is ensured by use of pressure relief valve 64. Pressure management occurs via a high pressure regulator 62, drawing from high pressure cylinder 61 and indirectly intensifier 60, and supplies the increased fluid pressure corresponding to the diminished Ram pressure until Ram pressure is zero and isolation check ball 102 is seated closed. This completes the isolation of the injection unit from the plastic resin within the nozzle assembly, allowing independent plasticizing to occur.

With the isolation of the injection unit, plasticizing of the next material shot can begin once NRV check ring 23 is seated. This sequence will function as it does within a conventional injection molding machine; whereby, the screw retraction allows resin pellets to feed (not illustrated) and melt heat via barrel heater bands (not illustrated) coupled with shear heat developed by injection screw 21 will create the transition from solid to liquid melt.

In the hold step of the injection molding cycle, as plastic resin crystallization progresses within the mold, additional fluid at the corresponding pressure is required to ensure plastic resin material 163 within nozzle body 110 flows into the mold occupying the crystallization voids ensuring part quality. Cylinder 61 is sized appropriately for excess pressurized gas at the anticipated consumption during the pack and hold steps of the cycle for various plastic resins and pressure regulator 62 in conjunction with control feedback from plastic melt transducer 230 and fluid pressure transducers 240, 241 and 242.

The end of the hold step of the cycle is defined as the point when the mold gate freezes effectively severing communication between melted plastic resin in the nozzle assembly and the molded part. Detecting the event of gate freeze can be accomplished by proactively detecting the plastic resin response to pressure pulses as supplied by pulse valve 90. Response is measured by pressure decay characteristics during the subsequent pressure fluid pulses providing a response proportional to degree of crystallization. This methodology of closed-loop detecting and reacting to the event of gate freeze is applicable to molding situations in general, not only specific to cycles which are recovery limited. The method of detecting gate freeze in the process described herein allows the conclusion of the hold step to be detected as an event-based step instead of a time-based approximation resulting in additional productivity gains.

Under these conditions, high pressure circuit dome valve 63 is closed, pulse circuit dome valve 66 is opened, pulse valve 90 supplies a higher pressure burst of fluid with pressure measurement from fluid transducer 240 or 242. Relief of the pressure is controlled by adjustments to pressure controlled relief valve 85 from high pressure cylinder 61 setting as measured by fluid transducer 241 decaying to regulator 62 pressure setting. The time necessary to accomplish the pressure decay is proportional to degree of crystallization at the gate and will differ depending on, and therefore need to accommodate, various different gate designs, specifics of the mold and mold environment and different plastic resin materials. This closed-loop detection method will allow the pressure decay characteristics to predict the specific gate freeze event even under these molding system variations.

Anytime after recognition of gate freeze, and prior to the commencement of the next injection cycle, the pressure of the external fluid should be released and the maximum evacuation facilitated. The evacuation of fluid occurs by closing two-way valve 80, opening exhaust two-way valve 83 permitting the external fluid to exhaust from the void space it occupies in plastic resin 163 with nozzle body 110 via a pathway through fluid distribution plenum 202, fluid runner 201, high pressure fitting 200 all as illustrated in FIG. 2, out through the exhaust filter 81 and finally discharged to atmosphere out of fluid exhaust/muffler 84. Safety is ensured through the use of pressure relief valve 82. The evacuation can be enhanced by controlling the external fluid pressure while opening isolation valve check ball 102 slightly under the influence of the injection unit ram pressure to enhance the evacuation.

As illustrated in FIG. 2, fluid evacuation occurs via the plurality of gas plenum holes 203 utilized for the introduction of the fluid. Upon completion, external fluid pressure control is resumed to prevent plastic resin 163 to backflow into gas plenum 202.

Figure 8A:
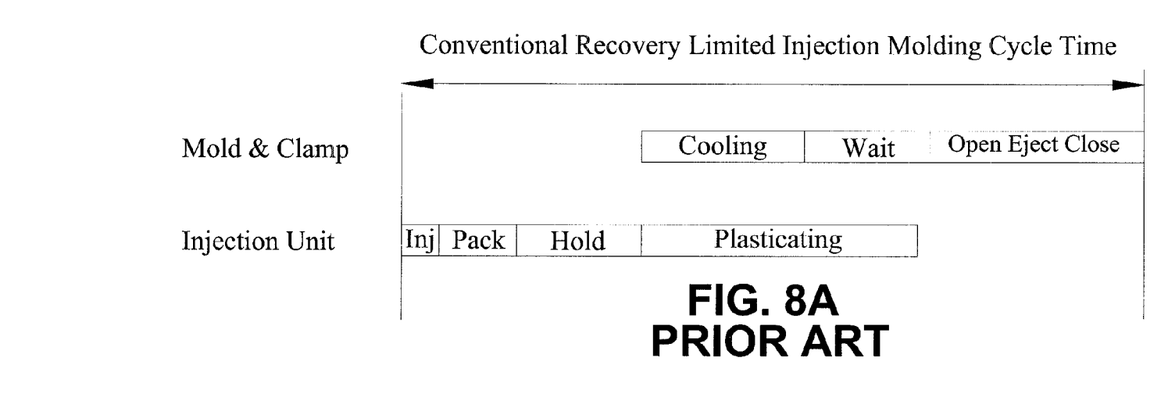
Figure 8B:
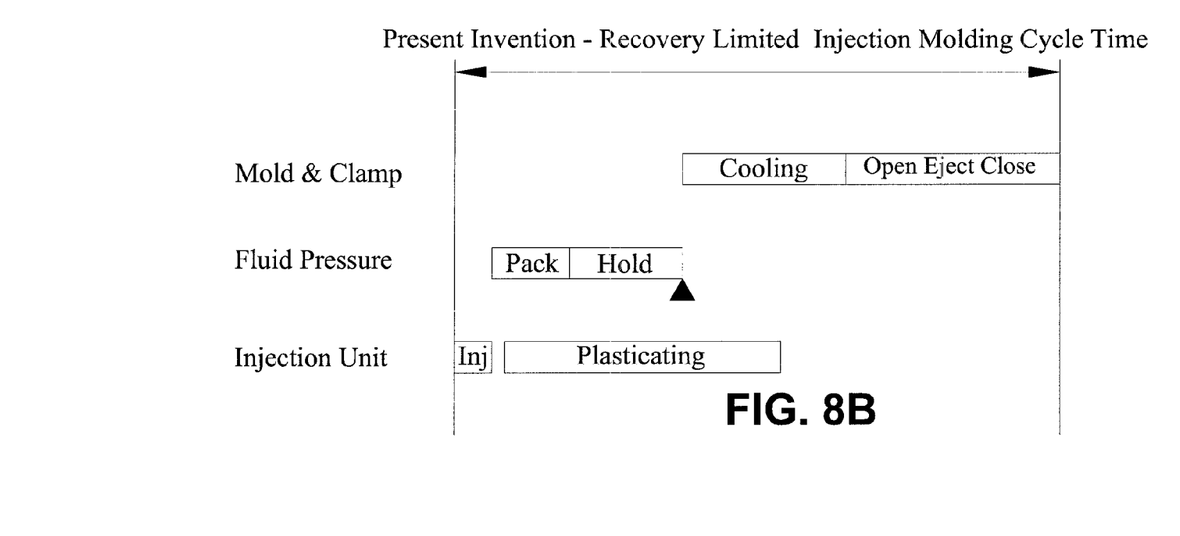

The effect on injection molding machine productivity, for parts that are recovery limited, is illustrated in FIG. 8. The cycle of the Prior Art is illustrated in FIG. 8A. The advantage of applying the methodology described in this patent is illustrated FIG. 8B. In this depiction, the injection unit provides the ram function to transfer the melted plastic resin from the injection unit into the mold cavity. Also, as shown, the delay after injection signifies the transfer of the pressure from the injection unit during the pack and hold steps of the cycle to the displacing fluid pressure. Once isolated, plasticizing can begin allowing this segment to overlap the functions of the pack and hold steps of the cycle. The decision for when to transfer the pressure during the hold step of the cycle from the injection unit ram to the external fluid pressure is flexible, accommodating the variations in part type, machine, mold and material characteristics to allow a user to optimize the particular cycle.

In addition, productivity is improved by the closed-loop detection for the end of the hold step of the cycle; this event is depicted by the solid triangle below the bar. Detecting the event of gate freeze rather than an approximate time setting optimizes both quality and productivity. Other sequences are identical between the conventional molding method and the present invention.

This methodology, closed-loop detection and reaction to the event of gate freeze, is applicable to injection molding part characteristics beyond those described in this patent and characterized as a recovery limited cycle. The methodology, as graphically portrayed in FIG. 8, with the corresponding fluid pressurization methodology, is applicable to any injection molding cycle for determining the concluding event of the hold step of the cycle.

Figure 3:
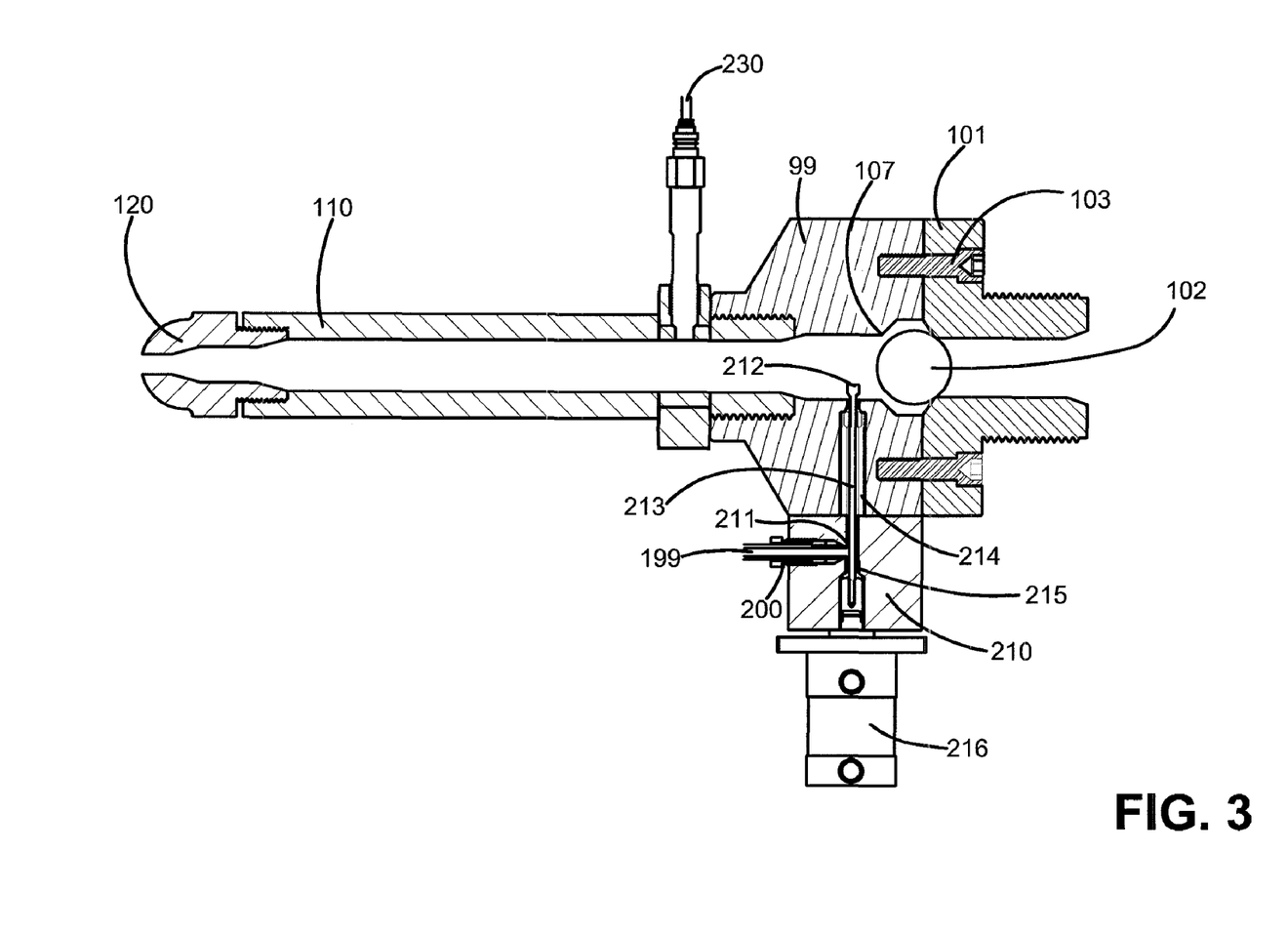
FIG. 3 is a cross-sectional side elevational view illustrating a further embodiment of the pressurized fluid introduction for use with the specialized isolation valve according to the present invention.

With reference now to FIG. 3, an actuated fluid pin entry is illustrated as an alternate to the fluid delivery system of FIGS. 1 & 2. Fluid entry assembly mounting body 210 attaches to nozzle adapter/isolation valve half 99 which is specific to this actuated fluid pin design and incorporates check valve balls stops 107. Fluid high pressure fitting 200 is connected to fluid runner 211 directing fluid to the plastic material within nozzle adapter/isolation valve 99 via actuated fluid pin head 212. The actuated fluid pin head is part of actuated fluid pin body 213 actuated by cylinder 216 and held in place by bushing 214 with through holes for fluid delivery and bushing 215 ensuring alignment. The operation of this alternate embodiment is very similar; however, no pressure is required during the injection segment of the molding cycle. Rather, at the pack or hold steps of the cycle, the fluid pin 212 actuates to open, displaces plastic material 163, introduces fluid pressure to both the material melt front and the isolation valve, closing the check valve ball 102 and isolating the injection unit. The fluid introduction also prevents plastic resin intrusion into actuated fluid pin body 213. Evacuation follows a reverse path to establish ambient fluid pressure. The closing of actuated fluid pin head 212 is coordinated with the resumption of injection unit ram pressure.

Figure 4:
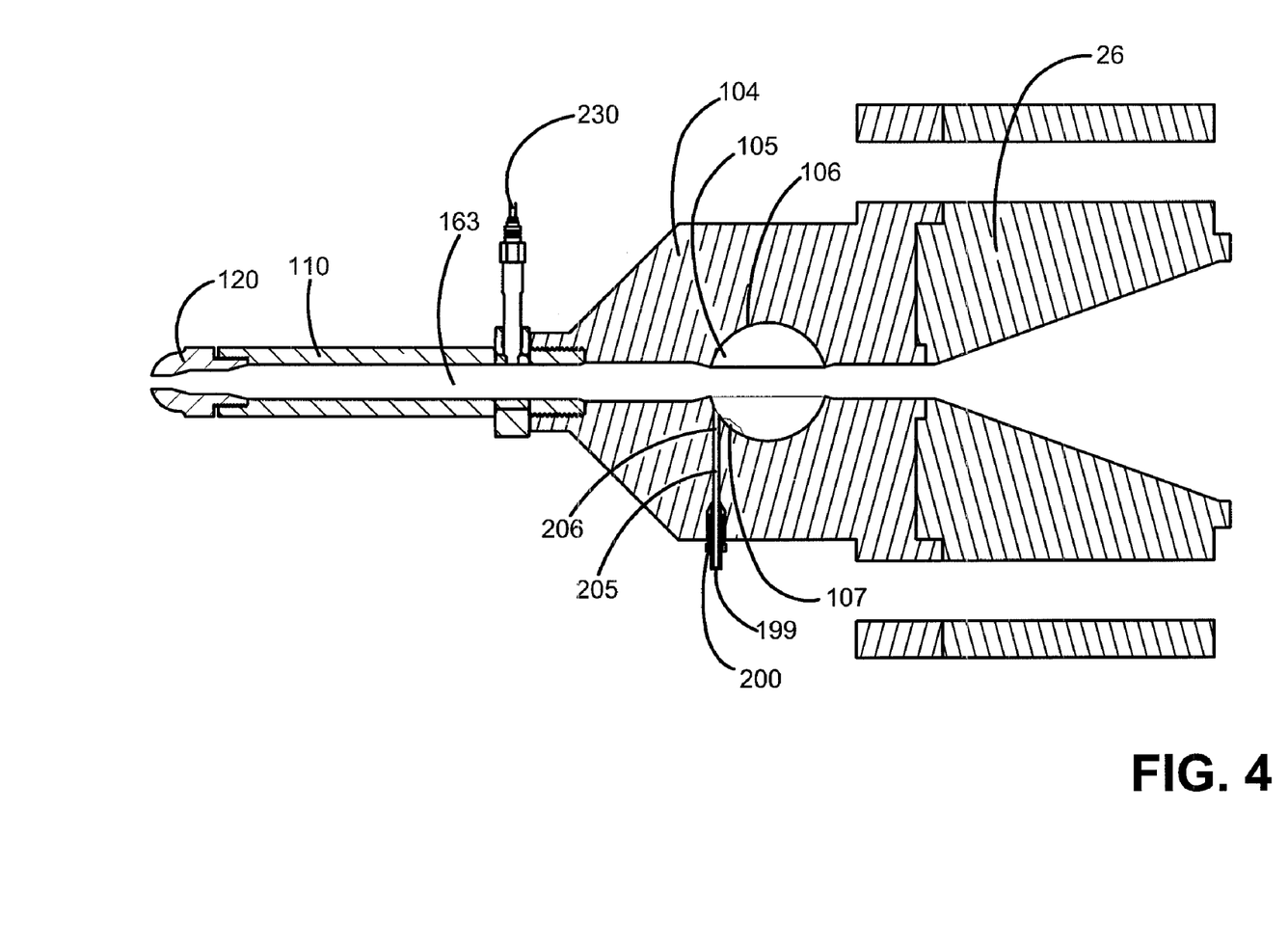
FIG. 4 is a cross-sectional side elevational view of the open isolation valve assembly and modified barrel end cap according to a further embodiment of the present invention.
Figure 5:
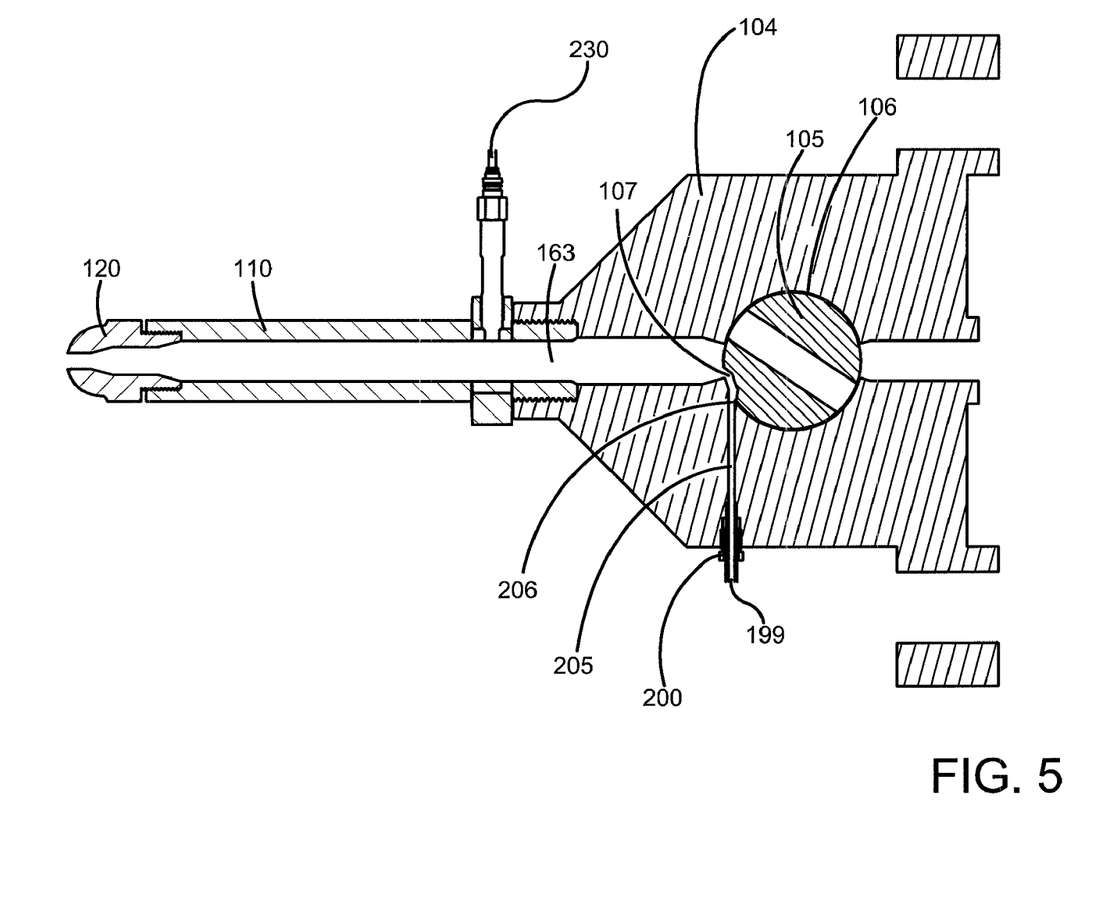
FIG. 5 is a cross-sectional side elevational view of the closed isolation valve assembly according to a further embodiment of the present invention.

An alternate isolation valve embodiment is illustrated in FIG. 4, shown with the isolation valve in the open position, allowing the injection unit ram function to provide the plastic melt motive force, and mounted to a suitably modified end cap 26. FIG. 5 illustrates the isolation valve closed as required during the pack step, hold step and cooling step of the cycle. As illustrated in FIG. 4, with rotary valve element 105 which fits tightly in rotary valve chamber 106 and permitting an unimpeded flow path for plastic resin 163 from injection unit modified end cap 26 through rotary valve 104 to nozzle body 110. The external fluid entry point 199 is via high pressure fitting 200 and channeled along fluid runner 205 to fluid channel termination point 206 which is blocked by rotary valve element 105. With rotary valve element 105 in the open position, the injection molding operation would be completely conventional.

Closing rotary valve element 105, as depicted in FIG. 5, isolates the injection unit (not shown) from the plastic resin within the mold (also not shown). During the rotation of rotary valve element 105, the injection unit ram pressure would be decreased as rotary valve element relief 107 is exposed, whereby direct fluid pressure would be applied to plastic resin 163. Pressure, via the external fluid flows from fluid entry point 199 at the corresponding high pressure fitting 200 comprised of a modified delivery tube, gland fitting, and collar. Rotary valve element relief 107 is sized in conjunction with the necessary rotation to complete the isolation via rotary valve element 105 and in consideration of the necessary fluid pressure increase required to offset the decrease of pressure from the injection unit ram while maintaining a stable pressure as applied to plastic resin 163 and as measured by plastic melt transducer 230. Rotation of rotary valve element 105 is precisely controlled to allow both the timing of fluid introduced and corresponding pressure developed allowing a smooth transition between injection unit ram pressure and external fluid-applied pressure as measured by fluid pressure transducer 242, and the corresponding situation is true in reverse for the fluid evacuation and resumption of injection unit ram pressure during injection.

Figure 6:
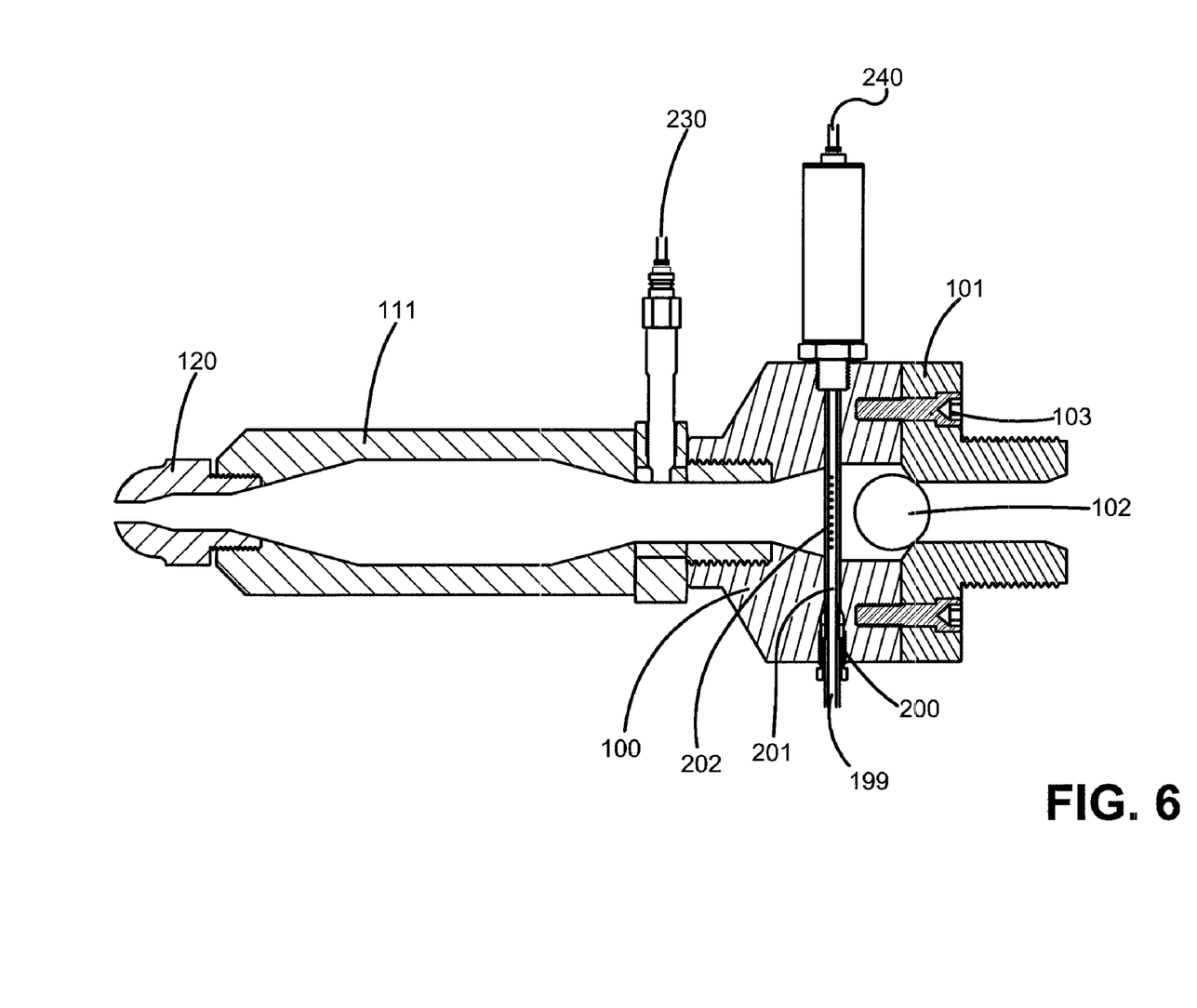
FIG. 6 is a cross-section side elevational view of the nozzle assembly of a certain embodiment of this invention, wherein the nozzle assembly provides an additional volumetric capacity to compensate for the shrinkage characteristics of certain plastic resin materials.

In FIG. 6, nozzle body 111 is shown to have enhanced volumetric capacity of plastic resin inventory reserve upstream of the mold and mold runner system. This additional reserve facilitates processing of plastic resins with greater shrinkage characteristics or the use of the external fluid early in the pack segment of the cycle ensuing adequate material displacement reserves for ensuring acceptable part quality. Although not illustrated, additional reserves can be provided by extending the length of the nozzle body, by enhancing the volumetric capacity of the Isolation Valve, or by providing a material well. In the foregoing description, certain terms have been used for brevity, clearness, illustration and understanding; but no unnecessary limitations are to be implied therefrom beyond the requirements of the prior art, because such terms are used for descriptive purposes and are intended to be broadly construed.

The injection molding process described above may be integrated within a new injection molding machine. Other embodiments of the invention foresee the process implemented on existing injection molding machines by way of a retrofit kit. The process described above may be implemented in combination with a fully hydraulic injection molding machine, a hydraulic toggle injection molding machine, a hybrid hydraulic electric injection molding machine, a fully electric injection molding machine, or any other injection molding machine known in the art.

The invention described herein may not be appropriate for use with every injection molding procedure. It is foreseen that the process described herein may be used on some injection molding procedures, while not used on other injection molding procedures, even using the same injection molding machine. The user may consider a number of factors in deciding whether the process is appropriate for their particular injection molding procedure, including but not limited to the productivity gain from removal of the recovery limited constraint, the various material shrinkage characteristics of the materials and process they are using and the limited material inventory available within the nozzle. The user may also want to consider the characteristics of the mold type they are using, including the gating, venting and cavities with the mold, among other characteristics. The user may also want to consider the part quality that is desired. Part quality can be highly influenced by how well the optimal molding conditions are maintained during the pack and hold steps of the cycle. In the conventional injection molding of the prior art, some pressure control is lost during the pack segment, especially if feedback is hydraulic pressure control for the injection unit. The process described herein uses a plastic pressure transducer within the nozzle that allows improved control of pressure within the nozzle and mold until gate freeze occurs, increasing the consistency and quality of the part. If the process described herein is used, the user can alter characteristics such as selectable pressure, the time of introduction of the external fluid pressure, the ramping or decay of the pressure, and other variables to accommodate their specific desired procedure.

The invention described herein presents many advantages to the present processes known in the art. The assembly permits the fluid displacing pressure to provide the packing and holding pressures for the part in the mold, while the injection screw plasticizes the next shot. For injection molding articles which are recovery limited, this allows the plasticizing to begin simultaneous with packing, reducing the overall injection molding cycle time. The isolation valve assembly and fluid delivery system can either be added to an existing machine or incorporated with a new injection molding machine to permit this productivity advantage to be employed by the user. The invention, as outlined, permits this operating method to be employed for suitable parts or not utilized with affecting the injection molding machines use in a conventional manner. The invention maintains proper pressure on the melt front during closure of the isolation valve and while gate freeze occurs ensuring optimal part quality. The invention provides a method to accommodate varying shrinkage characteristics of plastic resin via either varying the timing for closure of the isolation valve or providing additional inventory of material via an enhanced volume nozzle body. The isolation valve and associated components are continuous purged with material and are conceived as to allow no material hang-up points ensuring material residence times are not excessive. The invention provides appropriate feedback devices in the form of plastic melt transducers or any other device for sensing the degree of plastic melt as well as fluid pressure transducers or any other device for detecting pressure to permit optimal control of the injection molding cycle. This control includes the option for injecting plastic resin to a nozzle pressure transducer set point rather than a linear transducer position, followed by closed-loop pressure control of both packing and holding via similar transducer feedback and control to a set point. The invention provides a methodology for determining when the event gate freeze occurs, determining the end of the hold segment, and resulting in additional productivity savings via a cycle time reduction.

Described generally within the present application is an injection molding machine which includes an injection unit; a nozzle assembly; and a fluid injection unit. The injection unit injects hot resin through the nozzle assembly into a mold cavity. The fluid injection unit injects fluid into the nozzle assembly after the resin has filled the mold cavity. The injected fluid provides pressure on the injected resin during the hardening of the injected resin without the fluid entering the mold cavity. The injected fluid can be a liquid or a gas.

Described more specifically within the present application is an injection molding machine which includes an injection unit, wherein the injection unit includes an injection screw. The injection screw includes a non-return valve assembly. The injection screw is rotated and reciprocated axially forward and backward. Also included in the injection molding machine described herein is a nozzle assembly, wherein the nozzle assembly includes a nozzle body and a nozzle tip; and a fluid injection unit, wherein the fluid injection unit includes a high pressure fluid nozzle fitting connected to a fluid runner channel which is connected to a fluid distribution plenum. The nozzle assembly of certain embodiments of the invention may also include a reservoir designed to hold a second volume of hot resin to inject into said mold cavity following a shrinking of said original volume of hot resin within said mold cavity. The injection screw forces an original volume of hot resin through the nozzle assembly into a mold cavity, and the fluid injection unit injects fluid into the nozzle assembly after the resin has filled the mold cavity. The injected fluid provides pressure to displace the plastic reserve resin from the nozzle assembly and subsequently provide pressure on the injected original volume of resin during the hardening of the original volume of resin within the mold cavity, without the fluid entering said mold cavity. The fluid can be liquid or gas.

Also described herein is an injection molding process used to create a molded piece. The process includes the steps of injecting a first volume of heated resin from an injection unit through a nozzle assembly into a mold cavity; filling the mold cavity with the first volume of heated resin; injecting a volume of fluid into the nozzle assembly following the first volume of heated resin; utilizing the fluid within the nozzle unit to provide pressure on the first volume of resin in the mold cavity for a period of time while the first volume of resin hardens into the molded piece; preparing a second volume of heated resin within the injection unit during the period of time while the first volume of heated resin hardens into the molded piece within the mold cavity; and ejecting the molded piece from the mold cavity following the period of time. In certain embodiments of the invention the time period may begin when the fluid is injected into the nozzle assembly, and may end after either a predetermined length of time or when gate freeze is reached. In other embodiments of the invention the fluid may be released from the nozzle assembly prior to the ejection of the molded piece form the mold cavity. In further embodiments the fluid may be gas or liquid. In certain embodiments of the invention an additional volume of heated resin may be stored within the nozzle assembly and injected into the mold cavity during the period of time the fluid is providing pressure on the first volume of resin, due to the shrinkage of the first volume of resin.

Yet further described herein is an injection molding process used to create a molded piece which includes injecting a first volume of heated resin through a nozzle assembly of an injection molding machine into a mold cavity; filling the mold cavity with the first volume of heated resin; injecting a volume of fluid into the nozzle assembly following the first volume of heated resin; providing pressure on the first volume of resin within the mold cavity with the volume of fluid in the nozzle assembly for a period of time while the first volume of resin hardens into the first molded piece; simultaneously preparing a second volume of heated resin for injection into the mold cavity during the period of time; ejecting the first molded piece from the mold cavity following the period of time; and injecting the second volume of heated resin into the mold cavity immediately upon the ejection of the first molded piece. In certain embodiments of the invention the time period may begin when the fluid is injected into the nozzle assembly, and may end after either a predetermined length of time or when gate freeze is reached. In other embodiments of the invention the fluid may be released from the nozzle assembly prior to the ejection of the molded piece from the mold cavity. In further embodiments the fluid may be gas or liquid. In certain embodiments of the invention an additional volume of heated resin may be stored within the nozzle assembly and injected into the mold cavity during the period of time the fluid is providing pressure on the first volume of resin, due to the shrinkage of the first volume of resin.

It will be apparent to one skilled in the art that modifications can be made within the hereinbefore described assembly. Neither the preferred nor alternate embodiments described are to be construed as a limitation of the invention. Moreover, this invention has been described in detail with reference to specific embodiments thereof, including the respective best modes for carrying out each embodiment. It shall be understood that these illustrations are by way of example and not by way of limitation.

What is claimed is:

1. An injection molding process used to create a molded piece which comprises:
    injecting a first volume of heated resin from an injection unit through a nozzle assembly into a mold cavity;
    filling said mold cavity with said first volume of heated resin;
    injecting a volume of fluid into said nozzle assembly following said first volume of heated resin;
    isolating said injection unit from said first volume of heated resin within said mold cavity;
    utilizing said fluid within said nozzle assembly to provide pressure on said first volume of resin in said mold cavity for a period of time while said first volume of resin hardens into said molded piece, wherein said fluid pressure provided remains in said nozzle assembly and does not enter said mold cavity;
    preparing a second volume of heated resin within said injection unit during said period of time while said first volume of heated resin hardens into said molded piece within said mold cavity; and
    ejecting said molded piece from said mold cavity following said period of time.

2. The injection molding process of claim 1 wherein said period of time begins when said fluid is injected into said nozzle assembly and said period of time ends when gate freeze is reached.

3. The injection molding process of claim 1 wherein said period of time begins when said fluid is injected into said nozzle assembly and said period of time ends after a predetermined length of time.

4. The injection molding process of claim 1 which further comprises:
    releasing said fluid from said nozzle assembly prior to said ejection of said molded piece from said mold cavity.

5. The injection molding process of claim 1 wherein said injected fluid is a gas.

6. The injection molding process of claim 1 wherein said injected fluid is a liquid.

7. The injection molding process of claim 1 which further comprises:
    storing an additional volume of heated resin within said nozzle assembly; and
    injecting said additional volume of heated resin into said mold cavity during said period of time upon a shrinkage of said first volume of resin.

8. An injection molding process used to create a molded piece which comprises:
    injecting a first volume of heated resin through a nozzle assembly of an injection molding machine into a mold cavity;
    filling said mold cavity with said first volume of heated resin;
    injecting a volume of fluid into said nozzle assembly following said first volume of heated resin;
    isolating said injection molding machine from said first volume of heated resin within said mold cavity;
    providing pressure on said first volume of resin within said mold cavity with said volume of fluid in said nozzle assembly for a period of time while said first volume of resin hardens into said first molded piece, wherein the fluid pressure provided remains in said nozzle assembly and does not enter said mold cavity;

simultaneously preparing a second volume of heated resin for injection into said mold cavity during said period of time;

ejecting said first molded piece from said mold cavity following said period of time; and injecting said second volume of heated resin into said mold cavity immediately upon said ejection of said first molded piece.

9. The injection molding process of claim 8 wherein said period of time begins when said fluid is injected into said nozzle assembly and said period of time ends when gate freeze is reached.

10. The injection molding process of claim 8 wherein said period of time begins when said fluid is injected into said nozzle assembly and said period of time ends after a predetermined length of time.

11. The injection molding process of claim 8 which further comprises:

releasing said fluid from said nozzle assembly prior to said ejection of said molded piece from said mold cavity.

12. The injection molding process of claim 8 wherein said injected fluid is a gas.

13. The injection molding process of claim 8 wherein said injected fluid is a liquid.

* * * * *